United States Patent [19]

Yamashita et al.

[11] Patent Number: 4,628,952

[45] Date of Patent: Dec. 16, 1986

[54] GOVERNOR VALVE ASSEMBLY

[75] Inventors: Kouichi Yamashita, Miyazaki; Toshiaki Ishiguro, Nagoya; Kunio Morisawa, Okazaki, all of Japan

[73] Assignees: Aisin Seiki Kabushiki Kaisha, Kariya; Toyota Jidosha Kubushiki Kaisha, Toyota, both of Japan

[21] Appl. No.: 751,988

[22] Filed: Jul. 5, 1985

[30] Foreign Application Priority Data

Jul. 12, 1984 [JP] Japan ................................ 59-143203

[51] Int. Cl.⁴ ................................................ G05D 13/10
[52] U.S. Cl. .......................................... 137/54; 137/56
[58] Field of Search ..................................... 137/54, 56

[56] References Cited

U.S. PATENT DOCUMENTS 3,049,028 8/1962 English ............................ 137/56 X
3,566,894 3/1971 Satoh .................................... 137/54
3,568,696 3/1971 Kubo ..................................... 137/54

*Primary Examiner*—Robert G. Nilson
*Attorney, Agent, or Firm*—Burns, Doane, Swecker & Mathis

[57] ABSTRACT

A governor valve assembly for regulating hydraulic pressure by utilizing centrifugal force developed by the output shaft of a vehicle transmission when the output shaft is rotated has a first governor valve adapted for two-stage pressure regulation and a second governor valve for adapted for a single stage of pressure regulation disposed separately in a governor body supported on an output shaft. An output port of either one of the valves is communicated with a feed port of the other through a passageway in the governor body in order to obtain a three-stage hydraulic pressure characteristic.

5 Claims, 6 Drawing Figures

GOVERNOR VALVE ASSEMBLY

FIELD OF THE INVENTION

This invention relates to a governor valve assembly for obtaining a three-stage hydraulic pressure characteristic by regulating hydraulic pressure through use of the centrifugal force developed by a rotary shaft, particulary the output shaft, of a vehicle transmission.

BACKGROUND OF THE DISCLOSURE

One example of a governor valve assembly according to the prior art regulates supply pressure in three stages in response to an increase in the rotational speed of an output shaft.

Reference will be had to FIGS. 1 through 4 to give a more detailed description of conventional governor valve assemblies to which the present invention appertains and of the shortcomings possessed by such governor valve assemblies.

A governor valve assembly of the type that regulates supply pressure in three stages with an increase in the rotational speed of an output shaft is disclosed in the specification of U.S. Pat. No. 3,943,956. The three-stage regulation of line pressure is performed by a single governor valve, as shown in FIG. 1. When the output shaft, shown at numeral 1, is rotating at low speed, a governor weight 2, secondary weight 3, shaft 4, valve 5, outer spring 6 and inner spring 7 move outward together with respect to the shaft 1. The resulting hydraulic pressure, which counterbalances the centrifugal force acting upon the governor weight 2, secondary weight 3 and valve 5 and an inwardly directed force acting upon the valve 5, constitutes governor pressure $P_G$ at the prevailing vehicle speed. This operation represents the first stage of pressure regulation.

When the rotational speed of the output shaft 1 rises and the shaft begins rotating in an intermediate speed region, the outward movement of the shaft 4 is checked by the governor body shown at numeral 8. Now the hydraulic pressure counterbalances the centrifugal force acting upon the secondary weight 3 and valve 5 and the forces applied by the outer spring 6 and inner spring 7. This hydraulic pressure is the governor pressure $P_G$ at the prevailing vehicle speed. This is the second stage pressure regulation.

At high speed rotation of the output shaft 1, the outward movement of the secondary weight 3 is checked by the governor weight 2, so that the hydraulic pressure prevailing from this point onward counterbalances the centrifugal force acting upon the valve 5 and the forces applied by the outer spring 6 and inner spring 7. The resulting hydraulic pressure is governor pressure $P_G$. This represents the third stage of pressure regulation. The characteristic curve obtained by such three-stage pressure regulation effected by the governor valve assembly of FIG. 1 is illustrated in FIG. 2.

Another example of a prior-art governor valve assembly is as depicted in FIG. 3, in which two separate governor valves 10, 11 are arranged about the output shaft 1. In this arrangement, the governor valve 10 regulates pressure in response to an increase in the rotational speed of the output shaft 1, and the governor valve 11 is adapted to cut the governor pressure $P_G$ which prevails at low rotational speed. The resulting characteristic curve is as shown in FIG. 4.

SUMMARY OF THE DISCLOSURE

The governor valve assembly comprises a single governor valve having a governor weight, a secondary weight, a shaft, a valve, an outer spring and an inner spring which are arranged together in a limited space and adapted to move outwardly with respect to the output shaft when the shaft rotates at low speed. Owing to the narrow confines in which these governor valve components are installed, there is little space axially of the outer spring, which therefore is designed to have a large spring constant. This results in an outer spring which exhibits a large load. Since the outer spring load is not uniform from one valve to another, the valves employing the spring have different pressure regulation timings for each stage of regulation. This is a problem because it makes precise control of hydraulic pressure impossible to achieve. In addition, the load of the outer spring plays a role not only in second stage pressure regulation but also in the third stage of regulation and, hence, has a major effect upon third-stage pressure regulation timing and upon the hydraulic pressure characteristic.

Another example of a conventional governor valve assembly has two governor valves operating separately in association with the output shaft, one of the governor valves serving to regulate pressure in dependence upon an increase in output shaft rpm, the other being operable to cut the governor pressure at low rotational speed. The drawback with this assembly is that three-stage regulation of pressure is not achieved, so that fine multiple-stage control in response to vehicle speed cannot be carried out.

An object of the present invention is to provide a governor valve assembly devoid of the aforementioned drawbacks encountered in the prior art.

Another object of the present invention is to provide a governor valve assembly capable of performing three-stage regulation of pressure without any variance in governor pressure characteristic from one valve assembly to another.

Still another object of the present invention is to provide a governor valve assembly capable of performing three-stage regulation of pressure in which second-stage pressure regulation has no influence upon third-stage pressure regulation.

A further object of the present invention is to provide a governor valve assembly capable of performing three-stage regulation of pressure through fine control in response to vehicle speed.

According to the present invention, the foregoing objects are attained by providing a governor valve assembly comprising a first governor valve for performing two-stage pressure regulation and a second governor valve for performing a single stage of pressure regulation disposed separately in a governor body supported on an output shaft. Each of the first and second governor valves has a feed port and an output port, with the output port of either one of the valves being communicated with the feed port of the other in order to obtain a three-stage hydraulic pressure characteristic.

The first governor valve comprises a governor weight, a shaft and a valve that move radially together with the governor weight, and a spring compressed between the valve and the shaft, whereby the first governor valve is capable of performing two-stage pressure regulation. The second governor valve comprises a valve and a spring, which permit the second governor valve to execute a single stage of pressure regulation. The governor valve assembly is capable of producing a three-stage hydraulic pressure charcteristic by communicating the output port of the first governor valve with the feed port of the second governor valve, or the output port of the second governor valve with the feed port of the first governor valve.

In an exemplary arrangement in which the output port of the first governor valve is communicated with the feed port of the second governor valve, the governor weight, shaft, valve and spring of the first governor valve move radially outward together when the output shaft is rotating at low speed, so that a hydraulic pressure at which the centrifugal forces of the governor weight, shaft and valve and a radially inwardly directed force acting upon the valve are counterbalanced is delivered as governor pressure at the prevailing vehicle speed. This represents the first stage of pressure regulation. A radially inwardly directed force acting upon the valve of the second governor valve is weak at low-speed rotation of the output shaft, so that the valve is almost fully open by the force of its spring. As a result, the hydraulic pressure regulated by the first governor valve is delivered intact as governor pressure.

When the output shaft begins rotating in an intermediate speed range, further outward movement of the shaft of the first governor valve is inhibited by the governor body, from which point onward the first governor valve delivers a hydraulic pressure at which the centrifugal force of the valve and the force of the spring are counterbalanced. This is the second stage of pressure regulation performed by the first governor valve, with the second governor valve remaining essentially non-operative. Accordingly, the hydraulic pressure regulated by the first governor valve is delivered intact as governor pressure.

Finally, with a further increase in the rotational speed of the output shaft, the hydraulic pressure subjected to the second stage of regulation by the first governor valve assumes a large value, whereupon the force acting on the valve of the second governor valve becomes large in magnitude. This force overcomes the resultant of the centrifugal force and spring force of the second governor valve which, in response, performs the third stage of pressure regulation. This third stage of regulation is carried out by re-regulating, by means of the valve in the second governor valve, the hydraulic pressure regulated in the second stage of operation of the first governor valve.

According to the present invention, the structure of the second governor valve is such that a large space is provided for the installation of ahte spring used in the third stage of pressure regulation. This enables use of a spring having a small spring constant and, hence, diminishes any variance in the governor hydraulic pressure characteristic. In addition, since the second stage of pressure regulation has no influence upon the third stage, the governor hydraulic pressure characteristic can be changed separately at each stage.

Other features and advantages of the present invention will be apparent from the following description taken in conjunction with the accompanying drawings, in which like reference charcters designate the same or similar parts throughout the figures thereof.

FURTHER DISCUSSION OF THE PRIOR ART

Figure 1:
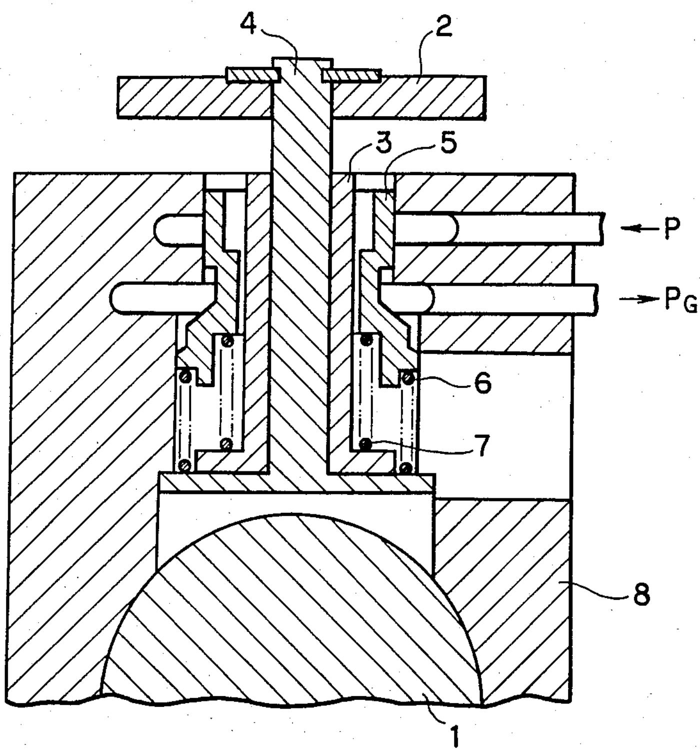
FIG. 1 is a transverse sectional view illustrating a governor valve assembly according to the prior art.

In the prior-art assembly of FIG. 1 which performs three-stage pressure regulation by means of a single governor valve, the secondary weight 3, valve 5, outer spring 6 and inner spring 7 are arranged in a limited space, so that there is little room left in the axial direction of the outer spring 6. Accordingly, the outer spring 6 is designed to have a large spring constant and consequently develops a large load. With such an arrangement, the load developed by the outer spring differs from one valve to another and, hence, so does the pressure regulation timing for each stage. This makes it impossible to achieve highly precise control using governor pressure. Another problem is that the load produced by the outer spring 6 has a bearing upon the third-stage of pressure regulation and not just the second stage. This has a major influence upon third-stage pressure regulation timing and upon the hydraulic pressure charcteristic.

Figure 3:
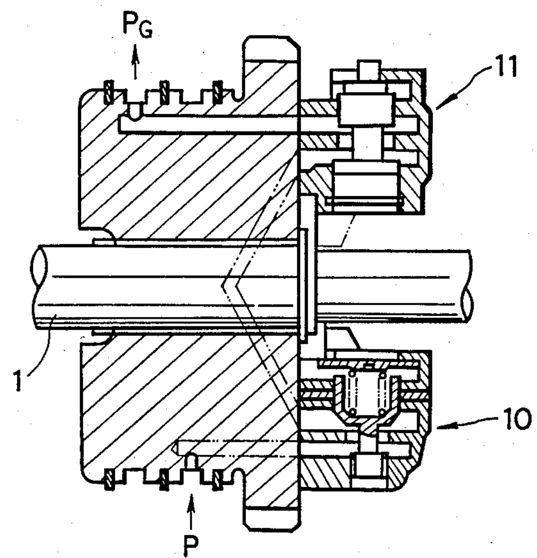
FIG. 3 is a longitudinal sectional view illustrating another example of a governor valve assembly according to the prior art.
Figure 4:
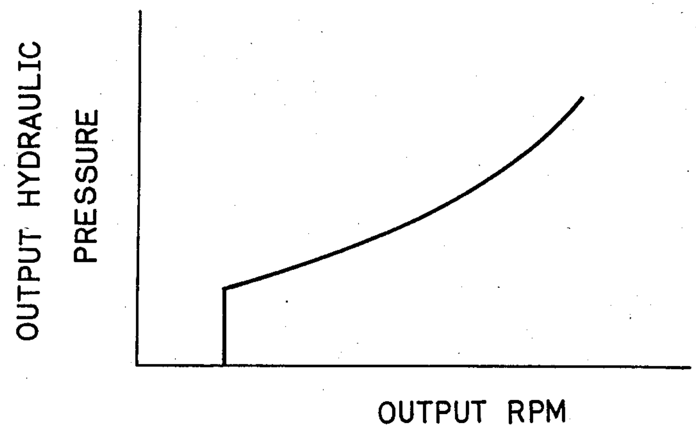
FIG. 4 is a hydraulic pressure characteristic of the governor valve assembly shown in FIG. 3.

The problem encountered in the prior-art arrangement of FIG. 3 having the two separate governor valves is that the hydraulic pressure characteristic does not exhibit three-stage regulation, as will be understood from the curve shown in FIG. 4. This means that fine control carried out over a number of stages in dependence upon vehicle speed is not possible.

The present invention contemplates elimination of these shortcomings encountered in the prior-art governor valve assemblies.

DESCRIPTION OF THE PREFERRED EMBODIMENT

Described hereinafter is a preferred embodiment of a governor valve assembly according to the present invention.

Figure 5:
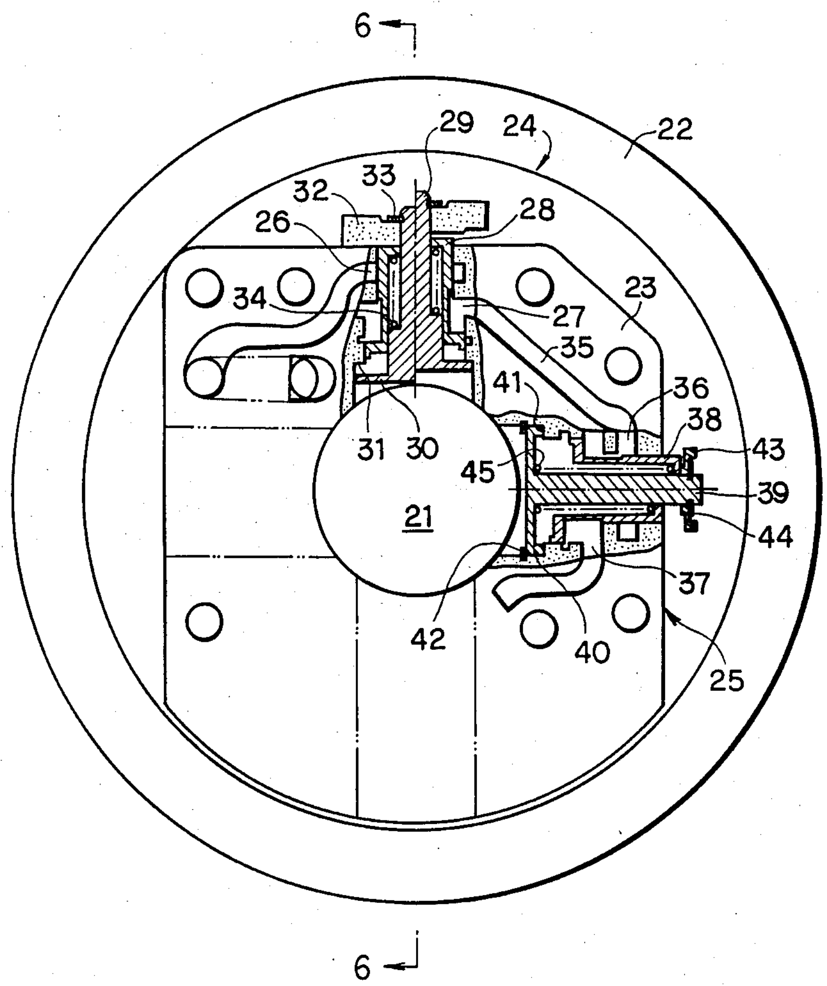
FIG. 5 is a front view, with principal portions thereof cut away, showing a governor valve assembly embodying the present invention.
Figure 6:
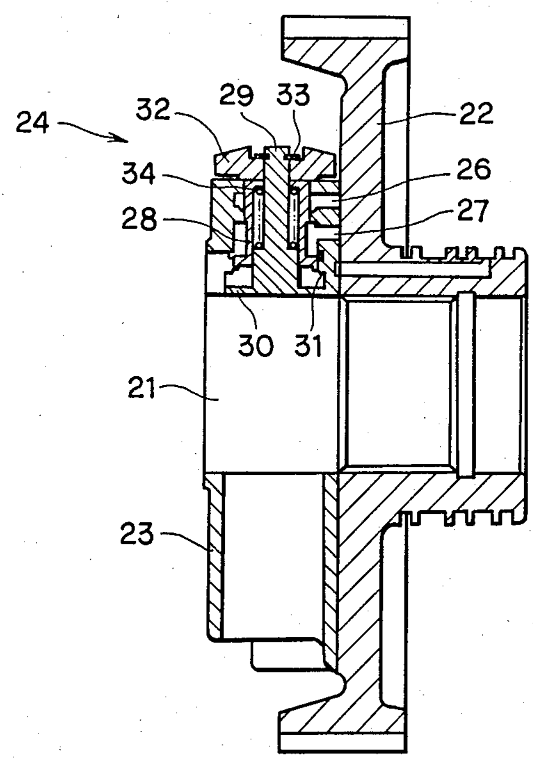
FIG. 6 is a sectional view taken along line 6—6 of FIG. 5.

With reference to FIGS. 5 and 6, there is shown an output shaft 21 having a governor support 22 splined thereto. A governor body 23 is securely fastened to the governor support 22 as by bolts. The governor body 23 accommodates a first governor valve 24 and a second governor valve 25. The first governor valve 24 is adapted for two-stage pressure regulation and is provided with a feed port 26 and an output port 27. The feed port 26 and output port 27 are provided on the same side of the output shaft 21, with the feed port 26 being located closer to the outer edge of the governor body 23 than the output port 27. The governor body 23 accommodates a valve 28 slidable in the radial direction so as to regulate pressure between the feed port 26 and output port 27. A valve shaft 29, which allows the valve 28 to perform the pressure regulating action, is radially slidably interiorly of the valve 28. The lower end of the valve shaft 29 has a flange 30 which comes into abutting contact with a shoulder 31 of the governor body 23 upon traversing a prescribed gap between the two, thereby limiting the radial travel of the shaft 29. A governor weight 32 is fastened to the outer end portion of the shaft 29 by a snap ring 33 located on the outer side of the governor weight. Formed between the valve 28 and shaft 29 is a space which accommodates a spring 34 applying a predetermined load in the radial direction.

The second governor valve 25 is adapted for a single stage of pressure regulation and is disposed at a position spaced from the first governor valve 24 by an angle of 90°. Like the first governor valve 24, the second governor valve 25 is provided with a feed port 36 and an output port 37, which are provided on the same side of the output shaft 21, the feed port 36 being located closer to the outer edge of the governor body 23 than the output port 37. The output port 27 of the first governor valve 24 is communicated with the feed port 36 of the second governor valve 25 by a passageway 35 formed in the governor body 23. As in the valve 28 of the first governor valve 24, the governor body 23 accommodates a valve 38 slidable in the radial direction so as to regulate pressure between the feed port 36 and output port 37. A radially extending shaft 39 penetrates the valve 38 and has a lower end formed to include a flange 40. With the latter in abutting contact with an end face 41 of the governor body 23, the shaft 39 is fixedly secured to the governor body 23 by a snap ring 42 provided on the side of the flange facing the output shaft 21. The upper end of the shaft 39 projects beyond the valve 38 and has a spacer 43 secured thereto by a snap ring 44 located on the outer side of the spacer. The latter is for limiting the outwardly directed radial movement of the valve 38. Arranged between the flange 40 of the shaft 39 and the valve 38 is a spring 45 for applying a predetermined load in the radial direction.

In operation, pressured oil ordinarily is supplied from an oil pump, not shown, to the feed port 26 of the first governor valve 24. When the output shaft 21 rotates, the governor support 22 splined thereto, and the governor body 23 secured to the governor support 22, rotate in unison. When the output shaft 21 is rotating at a low speed, the governor weight 32, shaft 29, valve 28 and spring 34 of the first governor valve 24 all move together to the position shown by the left half of the valve 24 in FIG. 5. At this time, a hydraulic pressure $P_{G1}$ is developed that counterbalances the centrifugal forces $F_{W1}$, $F_{S1}$, $F_{V1}$ and $F_{SP1}$ of the governor weight 32, shaft 29, valve 28 and spring 34, respectively, and an inwardly directed force $P_{G1}A_1$ acting upon the valve 28. The hydraulic pressure $P_{G1}$ is delivered from the output port 27 as governor pressure at the prevailing vehicle speed. $A_1$ represents the effective area of the inner side of the valve 28. The governor pressure $P_{G1}$ at the output port 27 is expressed by the equation $$P_{G1}=(F_{W1}+F_{S1}+F_{V1}+F_{SP1})/A_1$$

Oil at this governor pressure is supplied from the output port of the first governor valve 24 to the feed port 36 of the second governor valve 25 through the passageway 35. Since the value of $P_{G1}$ is small at low speed rotation of the output shaft 21, the force of the spring 45 urging the valve 38 of the second governor valve 25 radially outward is greater than an inwardly directed force $P_{G1}A_2$ acting upon the valve 38, where $A_2$ represents the effective area of the inner side of the valve 38. Accordingly, the valve 38 remains open, as indicated by the upper half of the valve in FIG. 5, so that oil exhibiting a pressure of $P_{G1}$ at the feed port 36 is discharged from the output port 37 without being regulated by the second governor valve 25. Consequently, a first stage of pressure regulation is performed solely by the first governor valve 24, with the governor pressure $P_{G2}$ being expressed by $P_{G2}=P_{G1}=(F_{W1}+F_{S1}+F_{V1}+F_{SP1})/A_1$. Thus, the governor pressure is decided solely by centrifugal force.

When the rotational speed of the output shaft 21 rises and the output shaft begins rotating at intermediate speed, the flange 30 of the shaft 29 constituting the first governor valve 24 abuts against the shoulder 31 of the governor body 23, as shown by the right half the valve of FIG. 5. Now a hydraulic pressure $P_{G1}$ that counterbalances the sum of the centrifugal forces $(F_{V1}+F_{SP1})$ of the valve 28 and spring 34 and a force $k_1x_1$ developed by the spring 34 is delivered from the output port 27 of the first governor valve 24. The governor pressure $P_{G1}$ which prevails at this time is expressed by $(F_{V1}+F_{SP1}+k_1x_1)/A_1$. Though the governor pressure $P_{G1}$ acts upon the valve 38 of the second governor valve 25 through the passageway 35, the sum of the force of the spring 45 urging the valve 38 radially outward and the centrifugal forces of the valve 38 and spring 45 prevails. As a result, the valve 38 remains open and the output of the first governor valve 24 is delivered from the output port 37 of the second governor valve without regulation by the second governor valve 24, just as in the first stage of pressure regulation described above. In other words, governor pressure $P_{G2}$ at this second stage of pressure regulation is expressed by $(F_{V1}+F_{SP1}+ k_1x_1)/A_1$. Thus, governor pressure is a function of the centrifugal forces of the valve 28 and spring 34 and the displacement of the spring 45.

Figure 2:
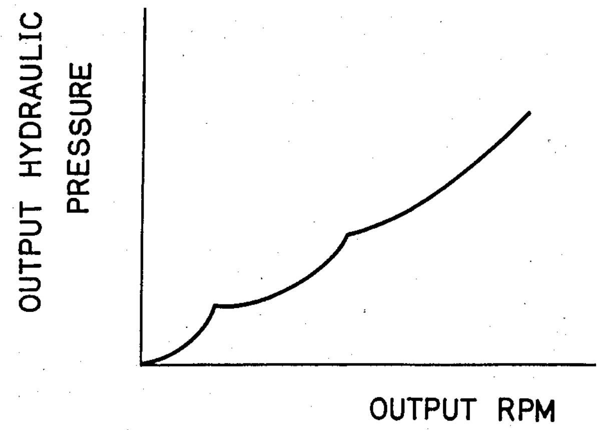
FIG. 2 is hydraulic pressure characteristic of the governor valve assembly shown in FIG. 1.

When the rotational speed of the output shaft rises further and the output shaft begins rotating at high speed, the governor pressure $P_{G1}$ developed by the first governor valve 24 takes on a large value and overcomes the sum of the force $k_2x_2$ of the spring 45 and the centrifugal forces $(F_{V2}+F_{SP2})$ of the valve 38 and spring 45 in the second governor valve 25. The governor pressure $P_{G1}(=P_{G2})$ at this time is expressed by $(F_{V2}+F_{SP2}+k_2x_2)/A_2$. With the value serving as a boundary, the valve 38 is urged radially inward and a third stage of pressure regulation is performed, as indicated by the lower half of the valve in FIG. 5. The governor pressure $P_{G2}$ of the second governor valve 25 in the third stage of regulation is expressed by $(F_{V2}+F_{SP2}+k_2x_2)/A_2$ and is delivered from the output port 37 of the second governor valve 25 without relation to the governor pressure $P_{G1}$ developed by the first governor valve 24. A three-stage hydraulic pressure characteristic of the kind shown in FIG. 2 can thus be obtained.

As many apparently widely different embodiment of the present invention can be made without departing from the spirit and scope thereof, it is to be understood that the invention is not limited to the specific embodiments thereof except as defined in the appended claims.

What we claim is:

1. A governor valve assembly for regulating hydraulic pressure by utilizing centrifugal force developed by a rotary shaft when the rotary shaft is rotated, comprising:

a governor assembly supported on the rotary shaft for co-rotation therewith;

first governor valve means provided in said governor assembly and having;

(a) a first feed port for receiving hydraulic pressure from an external source, (b) a first output port for delivering output hydraulic pressure, (c) a first valve radially slidable under centrifugal force in said governor assembly for regulating hydraulic pressure between said first feed port and said first output port, (d) a first shaft radially slidable interiorly of said first valve and cooperating with said first valve for regulating hydraulic pressure, (e) a governor weight fastened to an outer end portion of said first shaft for facilitating production of a centrifugal force, and (f) a first spring compressed radially between said first valve and said first shaft for applying a radially outwardly directed force upon said first valve;

second governor valve means provided in said governor assembly and having:

(g) a second feed port for receiving hydraulic pressure, (h) a second output port for delivering output hydraulic pressure, (i) a second radially extending shaft to be secured against radial movement to said governor assembly, (j) a second valve radially slidable under centrifugal force in said governor assembly along said second shaft for regulating hydraulic pressure between said second feed port and said second output port, and (k) a second spring compressed radially between said second valve and said second shaft for applying a radially outwardly directed force upon said second valve; and a passageway communicating said first output port of the first governor valve means with said second feed port of the second governor valve means.

2. The governor valve assembly according to claim 1, wherein said spring disposed in the second governor valve means is disposed so as to define the third stage of pressure regulation and not to allow the second governor valve means to act upon pressure regulation.

3. The governor valve assembly according to claim 1, wherein said governor assembly is formed as a governor body supported on said rotary shaft.

4. The governor valve assembly according to claim 3, wherein said passageway is provided in said governor body.

5. The governor valve assembly according to claim 1, wherein said first valve is caused to move outwardly guided by said first shaft under centrifugal force, and finally pressed against said governor weight.

* * * * *